(12) United States Patent
Algieri et al.

(10) Patent No.: US 12,339,963 B2
(45) Date of Patent: Jun. 24, 2025

(54) UNAUTHORIZED DATA ENCRYPTION DETECTION BASED ON PATTERN MATCHING AT A STORAGE SYSTEM

(71) Applicant: HEWLETT PACKARD ENTERPRISE DEVELOPMENT LP, Houston, TX (US)

(72) Inventors: Joseph E. Algieri, Santa Clara, CA (US); Alex Veprinsky, San Jose, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 350 days.

(21) Appl. No.: 17/662,764

(22) Filed: May 10, 2022

(65) Prior Publication Data
US 2023/0367876 A1    Nov. 16, 2023

(51) Int. Cl.
G06F 21/56    (2013.01)

(52) U.S. Cl.
CPC ...... *G06F 21/561* (2013.01); *G06F 2221/034* (2013.01)

(58) Field of Classification Search
CPC . G06F 21/561; G06F 2221/034; G06F 21/566
See application file for complete search history.

(56) References Cited

U.S. PATENT DOCUMENTS

| | | | |
|---|---|---|---|
| 9,507,531 B1* | 11/2016 | Shapiro | G06F 13/126 |
| 10,235,090 B1* | 3/2019 | Baruch | G06F 11/1471 |
| 10,609,066 B1* | 3/2020 | Nossik | H04L 63/1408 |
| 10,628,585 B2 | 4/2020 | Tamir et al. | |
| 10,810,133 B1* | 10/2020 | Volpe | G06F 12/128 |
| 11,030,314 B2 | 6/2021 | Kucherov et al. | |
| 11,662,928 B1* | 5/2023 | Kumar | G06F 11/1458 713/150 |
| 2007/0226297 A1* | 9/2007 | Dayan | H04L 51/48 709/206 |
| 2016/0077977 A1* | 3/2016 | Narayanamurthy | H04L 63/123 713/193 |
| 2020/0186542 A1* | 6/2020 | Strogov | H04L 63/0227 |
| 2020/0250306 A1* | 8/2020 | Pendyala | G06F 21/56 |
| 2021/0271758 A1 | 9/2021 | Bedhapudi et al. | |
| 2021/0329031 A1* | 10/2021 | Wira | G06F 9/45545 |
| 2021/0334374 A1* | 10/2021 | Vasudeva | G06F 21/54 |
| 2023/0231882 A1* | 7/2023 | Deng | H04L 63/1416 726/23 |
| 2024/0012721 A1* | 1/2024 | Yosub | G06F 16/128 |

* cited by examiner

*Primary Examiner* — Carl G Colin
*Assistant Examiner* — Andrew Suh
(74) *Attorney, Agent, or Firm* — Trop, Pruner & Hu, P.C.

(57) ABSTRACT

In some examples, a storage system intercepts a write request communicated over a network from a requester in a host system, the write request to write data of a data volume. The storage system determines whether the data of the write request matches a specified pattern. In response to determining that the data of the write request does not match the specified pattern, the storage system indicates that the write request from the requester in the host system has been corrupted by malware that has performed an unauthorized encryption on the data.

19 Claims, 4 Drawing Sheets

UNAUTHORIZED DATA ENCRYPTION DETECTION BASED ON PATTERN MATCHING AT A STORAGE SYSTEM

BACKGROUND

A ransomware attack involves encrypting data on a computer or on multiple computers. In a ransomware attack, data can be encrypted using an encryption key, which renders the data inaccessible by users unless a ransom is paid to obtain the encryption key. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

Figure 1:
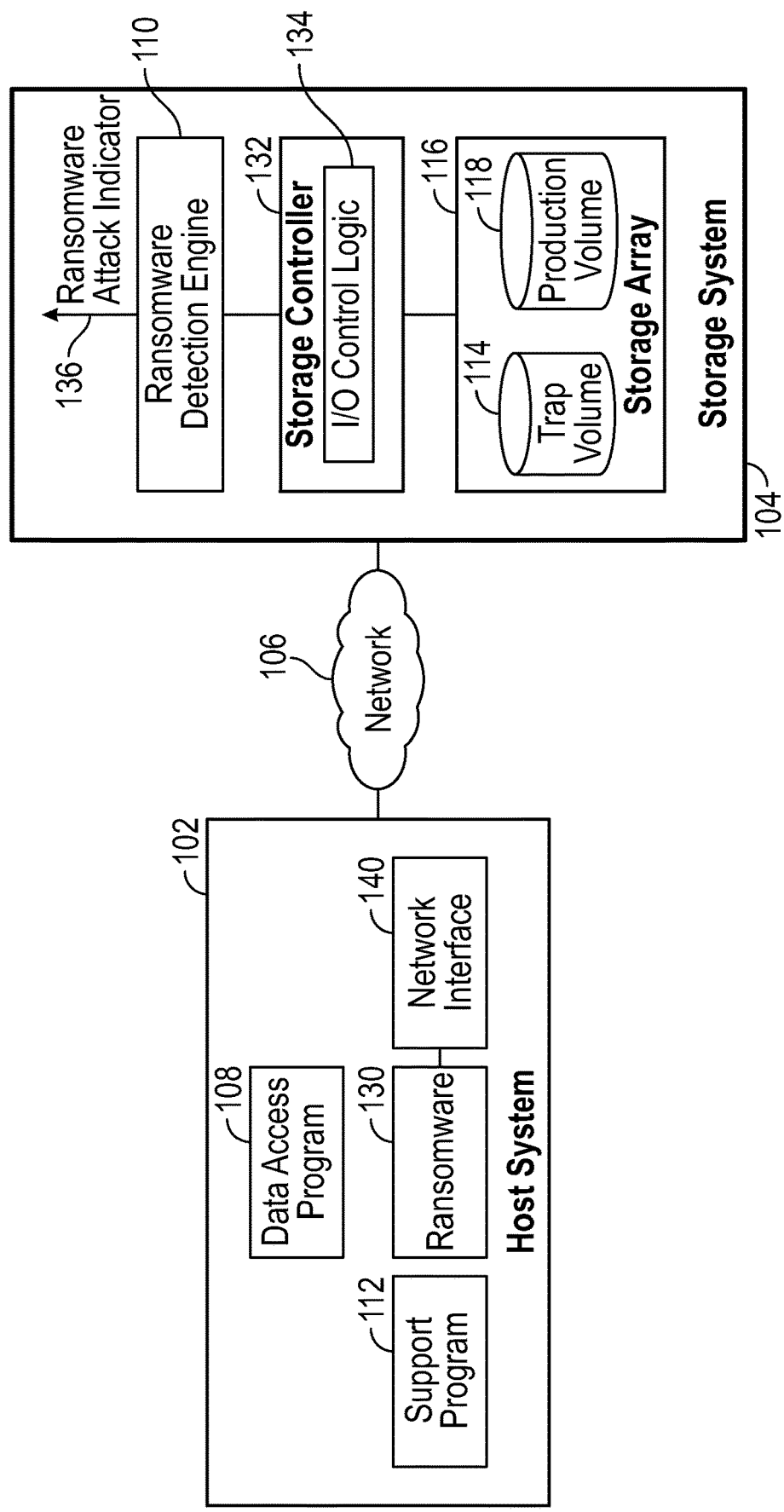
FIG. 1 is a block diagram of an arrangement that includes a host system and a storage system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A ransomware attack can be difficult to detect. By the time an enterprise becomes aware of the attack, enough of the data has been encrypted to render it unusable. A ransomware attack can be difficult to detect because normal computer operations may also encrypt data that is being stored to a storage system, so that distinguishing between authorized and unauthorized encryption of data can be challenging. When normal computer operations encrypt data, a ransomware detection technique that merely checks for encrypted data in input/output (I/O) operations with the storage system would not be effective since authorized I/O operations would contain encrypted data.

Enterprises may attempt to protect themselves from ransomware attacks by backing up data from computer(s) to backup storage systems. However, ransomware attacks often first attack a backup storage system to encrypt data on the backup storage system or, alternatively, delete the backup data, before encrypting data on computer(s), so that both data in the backup storage system and on the computer(s) become inaccessible.

Some ransomware detection techniques may look at I/O operations initiated by any of various different requesters to look for suspicious I/O patterns that include encrypted data. However, looking at a large quantity of I/O operations from many requesters may consume significant processing resources and can slow down the I/O operations. In further examples, ransomware detection techniques may create a snapshot copy of a data volume, and can compare this snapshot (which is a point-in-time copy of the data volume) to a live data volume to look for suspiciously encrypted blocks of data. However, such techniques also can be burdensome on processing resources.

Although reference is made to ransomware attacks in some examples, it is noted that there may be other sources of unauthorized data encryption in other examples, either caused by malware or other unauthorized entities (humans, programs, or machines). An "unauthorized data encryption" refers to a data encryption in which data has been encrypted by any entity that is not allowed to or is not supposed to perform the encryption.

In accordance with some implementations of the present disclosure, ransomware detection is based on intercepting, with unauthorized encryption detection instructions in a storage system, a write request received over a network from a designated requester in a host system. The "designated" requester refers to an entity (e.g., a special program, a special hardware component, etc.) in the host system that has been identified for use in cooperation with the unauthorized encryption detection instructions to perform detection of unauthorized encryption of data. The designated requester is different from other requesters in the host system that may perform I/O operations with respect to data volumes in the storage system.

The intercepted write request from the designated requester is to write data of a data volume in the storage system. The unauthorized encryption detection instructions can determine whether the data of the write request matches a specified pattern, and in response to determining that the data of the write request does not match the specified pattern, the unauthorized encryption detection instructions can indicate that an unauthorized encryption of data has occurred.

FIG. 1 is a block diagram of an example arrangement that includes a host system 102 and a storage system 104. The host system 102 can include a computer system, such as a server computer, or another type of computer system. As used here, a "host system" can refer to any computer system that is able to submit I/O requests to perform data access of data stored in the storage system 104. A data access can refer to a read access or a write access.

There may be more than one host system 102 that is able to access the storage system 104.

A "storage system" can refer to any computing infrastructure that includes a storage medium and associated control logic to store data.

In examples according to FIG. 1, the host system 102 is coupled over a network 106 to the storage system 104. The network 106 can include a local area network (LAN), a storage unit area network (SAN), a public network such as the Internet, or any other type of network. The host system 102 includes a data access program 108 (e.g., an application program, an operating system (OS), a utility program, and so forth) that can issue I/O requests to the storage system 104.

A "program" can include machine-readable instructions that can execute on a hardware processor (or multiple hardware processors).

A hardware processor can include a microprocessor, a core of a multi-core microprocessor, a microcontroller, a programmable integrated circuit, a programmable gate array, or another hardware processing circuit.

In some examples, the data access program 108 can encrypt data that is to be written to the storage system 104. Thus, the storage system 104 stores encrypted data in response to write requests from the data access program 108. Data encryption performed by the data access program 108 is considered an authorized data encryption.

Although not shown, the data access program 108 can issue I/O requests to the storage system 104 in response to requests received from client devices coupled to the host system 102. There may be multiple data access programs that are able to perform authorized data encryption of data written to the storage system 104.

In accordance with some examples of the present disclosure, a support program 112 is provided in the host system 102. The support program 112 is a specially designated program that a ransomware detection engine 110 in the storage system 104 is to cooperate with to detect a ransomware attack.

More generally, the host system 102 includes a designated requester (a program or a hardware component) that the ransomware detection engine 110 in the storage system 104 is to cooperate with to detect a ransomware attack. The designated requester is different from other requesters (such as the data access program 108) that are to perform I/O operations with respect to the storage system 104, where the I/O operations can include write operations that encrypt data.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, ransomware 130 can infect the host system 102, and can corrupt write requests from entities (e.g., the support program 112, the data access program, etc.) in the host system 102. The ransomware 130 can intercept the write requests from the entities in the host system 102, and can encrypt the write data of the intercepted write requests. Such encryption of the write data constitutes unauthorized encryption of data. A "corrupted write request" is a write request associated with write data that has been encrypted in an unauthorized manner.

The encrypted write data as encrypted by the ransomware 130 can be written to target data volume(s) in the storage system 104 in response to the corrupted write requests. As a result, the target data volume(s) become corrupted due to the storing of the encrypted data produced by the ransomware 130 into the target data volume(s).

The host system 102 includes a network interface 140 to allow the host system 102 to perform communications over the network 106. In some examples, the ransomware 130 is able to corrupt write requests from entities in the host system 102 prior to the write requests being sent by the network interface 140 over the network 106.

The network interface 140 can include a transceiver to transmit and receive signals over the network 106, as well as various protocol layers that govern the protocols used for communicating data over the network 106.

As used here, a "data volume" refers to a collection of data that is stored in a storage array 116 of the storage system 104. The data volume can be a logical data volume stored on the physical storage device(s) of the storage array 116. A "storage array" can refer to a collection of storage devices, where a "collection of storage devices" can include a single storage device or multiple storage devices. A storage device can be implemented using any or some combination of the following: a disk-based storage device, a solid-state drive, a memory device, and so forth.

In FIG. 1, a production volume 118 and a trap volume 114 are examples of data volumes stored in the storage array 116. Note that there may be more than one production volume 118 and/or more than one trap volume 114 in other examples.

A "trap volume" can refer to a data volume that is not used to store normal data (production data) associated with I/O requests (read and write requests) from authorized requesters, including users, programs (e.g., the data access program 108), and/or machines. On the other hand, a "production volume" stores normal data (production data) associated with I/O requests from authorized requesters.

The trap volume 114 stores "dummy" data, which is data that is not used by authorized requesters. The trap volume 114 is a honeypot designed to receive encrypted write data as a result of corrupted write requests as corrupted by the ransomware 130 in the host system 102 or any other malware in the host system 102 or another host system.

An "authorized requester" can refer to any requester that has been designated by an administrator or another entity as being authorized to perform I/O operations with respect to the storage system 104.

In further examples, instead of providing the trap volume 114 that is separate from the production volume 118, a portion of the production volume 118 can be used as a honeypot for detecting ransomware activity (or any other activity that results in unauthorized encryption of data). For example, a collection of objects (e.g., files, blocks, etc.) can be used a trap object(s) to receive encrypted data from malware.

In some examples, the trap volume 114 can include a read-write snapshot that includes a copy of data in the production volume 118. As an example, the storage system 104 (e.g., at the request of the host system 102 or another entity, whether external or internal of the storage system 104) can create a read-only snapshot of the production volume 118. Once the read-only snapshot is created, a read-write snapshot can be created based on the read-only snapshot.

A "snapshot" of a data volume refers to a point-in-time copy of the data in the data volume. The snapshot represents a copy of the data volume at a given point in time, i.e., at the time that the snapshot was created.

A "read-only snapshot" is a snapshot that is not subject to being modified by write accesses after the read-only snapshot has been created. A "read-write snapshot" is a snapshot that can be modified by writes to the read-write snapshot.

In examples according to FIG. 1, the support program 112 can issue I/O requests to read data of the trap volume 114 (e.g., a read-write snapshot) and to write data to the trap volume 114. Note that in some examples, the support program 112 does not issue I/O requests to any production volumes (including the production volume 118). In other words, the role of the support program 112 is to assist in detecting occurrences of unauthorized data encryption.

The support program 112 can issue I/O requests to the trap volume 114 to simulate I/O activity with respect to the trap volume 114. As a result, the ransomware 130 that may have infected the host system 102 may observe I/O accesses of the trap volume 114, and can thus identify the trap volume 114 as a target for encryption by the ransomware 130.

The ransomware detection engine 110 in the storage system 104 intercepts I/O requests from the support program 112. The I/O requests from the support program 112 can identify the support program 112 as the originator or source of the I/O requests. For example, each such I/O request can include an identifier of the support program 112, such as a network address of the support program 112 (e.g., a Medium Access Control (MAC) address or an Internet Protocol (IP) address), a port number, a uniform resource identifier (URI), or any other type of identification information.

If the I/O requests from the support program 112 are read requests, the ransomware detection engine 110 allows the read requests to proceed to a storage controller 132 of the storage system 104. The storage controller 132 then returns read data from the read-write snapshot 122 to the support program 112.

The storage controller 132 can be implemented with a hardware processing circuit, or machine-readable instructions executable by the hardware processing circuit. The ransomware detection engine 110 can be part of the storage controller 132 or can be separate from the storage controller 132.

The storage controller 132 includes I/O control logic 134 that is able to process I/O requests received by the storage controller 132, including read requests from the support program 112 that the ransomware detection engine 110 allows to pass to the I/O control logic 134, and I/O requests from other entities in the host system 102 or elsewhere.

The I/O control logic 134 can be implemented using a portion of the hardware processing circuit of the storage controller 132, or machine-readable instructions executable by the storage controller 132.

The I/O control logic 134 processes a read request by issuing corresponding command(s) to the storage array 116 to retrieve data from a target data volume. The I/O control logic 134 processes a write request by issuing corresponding command(s) to the storage array 116 to write data to a target data volume.

Write requests from the support program 112 to write data to the read-write snapshot 122 are rejected by the ransomware detection engine 110, which prevents the write requests from being processed by the I/O control logic 134 in the storage controller 132. However, the ransomware detection engine 110 or the storage controller 132 can send write success acknowledgments of the write requests even though they have been rejected. In other examples, the success acknowledgments are not sent.

Figure 2:
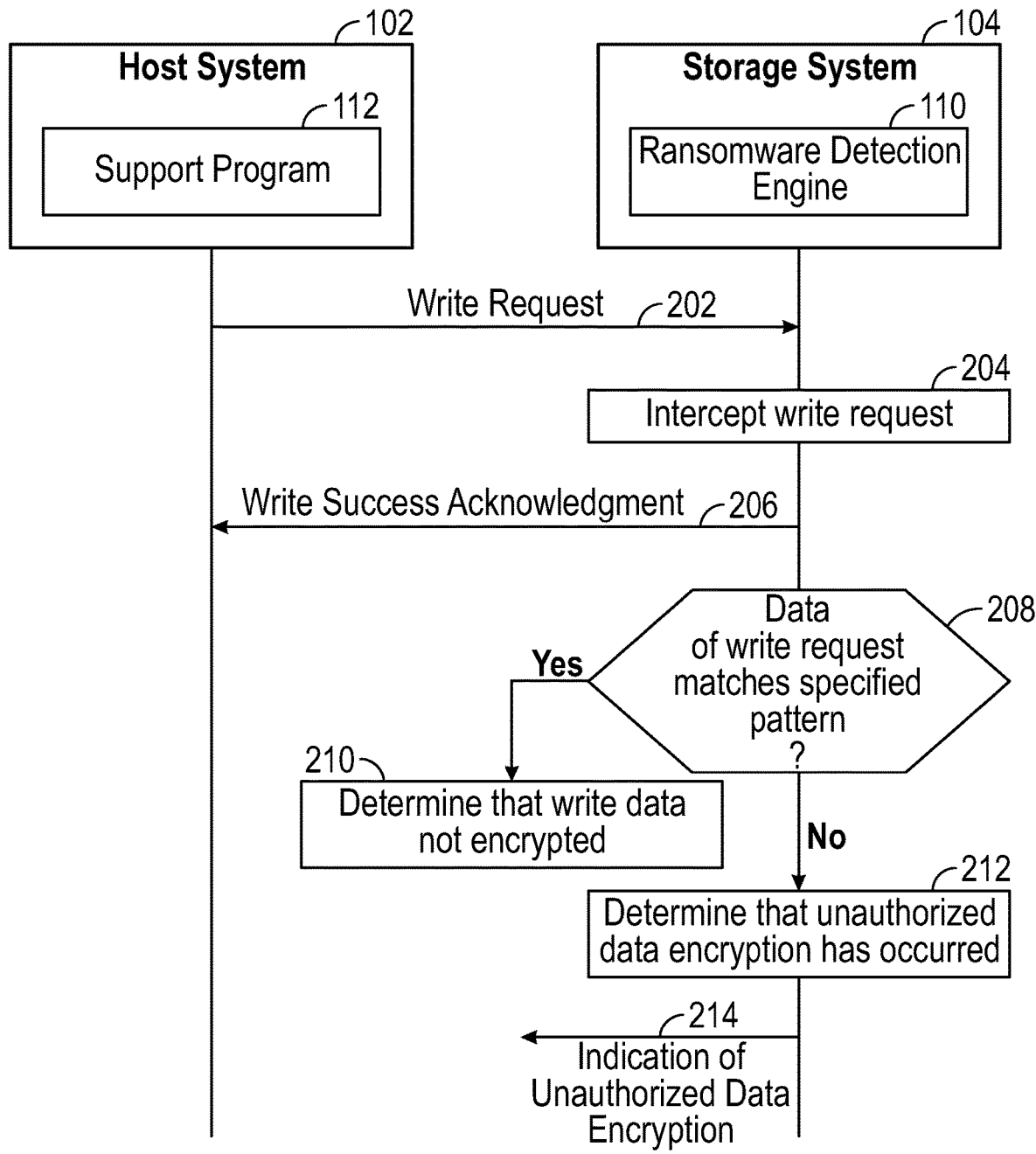
FIG. 2 is a message flow diagram of a process involving a host system and a storage system, according to some examples.

FIG. 2 is a message flow diagram of a process performed by the support program 112 in the host system 102 and the ransomware detection engine 110 in the storage system 104, according to some examples of the present disclosure.

The support program 112 sends (at 202) a write request to write data to the trap volume 114 in the storage system 104. The write request sent by the support program 112 may or may not be corrupted by malware, depending upon whether such malware (e.g., the ransomware 130) has infected the host system 102.

The ransomware detection engine 110 intercepts (at 204) the write request from the support program 112 that is received over the network 106. As an example, the ransomware detection engine 110 can detect that the write request identifies the support program 112 as the source of the write request, and thus the ransomware detection engine 110 can make a determination that the write request that identifies the support program 112 as the source is to be intercepted before reaching the I/O control logic 134 of the storage controller 132.

For each write request from the support program 112 intercepted by the ransomware detection engine 110, the ransomware detection engine 110 sends (at 206) a write success acknowledgment of the write request to indicate that the requested write has completed. Note that even though the write success acknowledgment is sent, writes by the support program 112 to the trap volume 114 are not allowed by the ransomware detection engine 110.

The ransomware detection engine 110 determines (at 208) whether the data of the write request matches a specified pattern. This determination is for detecting whether or not the write request has been corrupted by malware, such as the ransomware 130.

In some examples, the specified pattern includes a value derived from a function applied on storage location information at which the data of the write request is to be stored. The storage location information specifies a storage location in a data volume, such as the trap volume 114. In some examples, the storage location information can be in the form of a logical address of a data block in the trap volume 114. In other examples, the storage location information can include a physical address of a storage device in the storage array 116. The storage location information can be included in the write request.

The function applied on the storage location information can be a cryptographic hash function, such as a Secure Hash Algorithm (SHA) hash function, which takes an input value and produces a hash value of a specified length. In such examples, the storage location information in the write request specifies the storage location to which the hash value derived by applying the hash function on the storage location information is written. Thus, in such examples, write data of a write request from the support program 112 is a hash value based on a hash function applied on the storage location information of the write request.

In other examples, the specified pattern can be a different type of data pattern. For example, the specified pattern can include a collection of data values that can be written to the trap volume 114. The support program 112 can select a data value from the collection of data values to write to the trap volume 114. For example, the support program 112 can select a data value from among the collection of data values based on the storage location information of the write request, where the selected data is write data for a write request issued to the trap volume 114.

In other examples, other types of specified patterns can be used for purposes of detecting whether or not a write request has been corrupted by malware (e.g., the ransomware 130).

If ransomware detection engine 110 determines (at 208) that the data of the intercepted write request from the support program 112 matches the specified pattern, then the ransomware detection engine 110 can make a determination (at 210) that the write data associated with the write request has not been encrypted by the ransomware 130.

However, if the ransomware detection engine 110 determines (at 208) that the data of the write request does not match the specified pattern, then the ransomware detection engine 110 can make a determination (at 212) that unauthorized data encryption has occurred. In response, the ransomware detection engine 110 sends (at 214) an indication of unauthorized data encryption, which can be in the form of a ransomware attack indicator 136. The ransomware attack indicator 136 can be in the form of a message, an information element, a signal, or any other type of indicator.

The ransomware attack indicator 136 can be sent to a target entity in the host system 102, such as an intrusion management engine, an OS, a firmware, and so forth. Alternatively, the ransomware attack indicator 136 can be sent by the ransomware detection engine 110 to a target entity that is remote from the host system 102, such as an administrator, a program, or a machine. The target entity in the host system 102 or the remote target entity can take action to remediate against the ransomware attack, such as by shutting down the host system 102 and/or the storage system 104, or otherwise preventing any further writes from occurring to the storage system 104.

Figure 3:
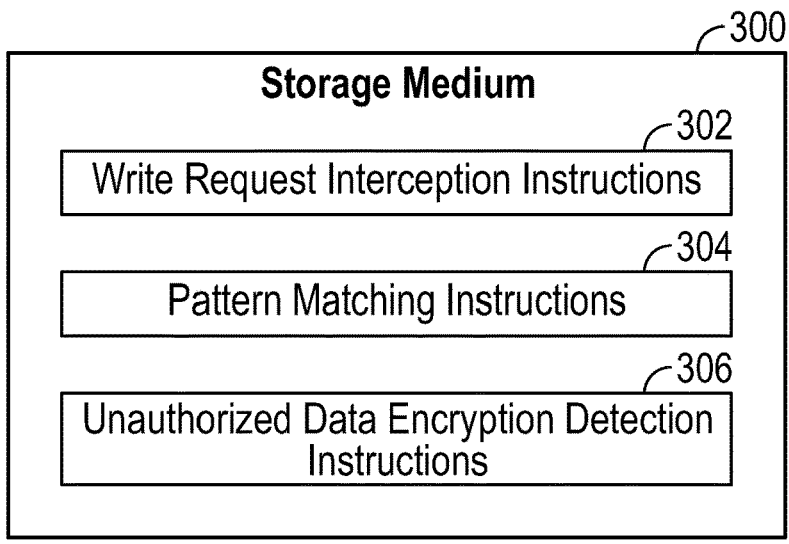
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a storage system to perform various tasks.

The machine-readable instructions include write request interception instructions 302 to intercept, at the storage system, a write request communicated over a network from a designated requester (e.g., the support program 112) in a host system. The write request is to write data of a data volume, such as the trap volume 114 of FIG. 1.

In some examples, the write request interception instructions 302 can intercept the write request from the designated requester prior to the write request being processed by I/O control logic (e.g., 134 in FIG. 1) in the storage system.

In some examples, the write request interception instructions 302 do not intercept write requests from entities other than the designated requester in the host system.

The machine-readable instructions include pattern matching instructions 304 to determine, at the storage system, whether the data of the write request matches a specified pattern. In some examples, the specified pattern includes a value derived from a function (e.g., a hash function) applied on storage location information (e.g., a logical block address) at which the data of the write request is to be stored. The storage location information specifies a storage location in the data volume.

In some examples, the machine-readable instructions can acknowledge a completion of the write request without performing a write of the data in the data volume.

The machine-readable instructions include unauthorized data encryption detection instructions 306 to, in response to determining that the data of the write request does not match the specified pattern, indicate that the write request from the requester in the host system has been corrupted by malware that has performed an unauthorized encryption on the data.

In some examples, the data volume to which the write request is issued by the designated requester is a trap volume, which can be a read-write snapshot of a production volume, or alternatively, can be a portion (a file or multiple files) of the production volume. Using file(s) in the production volume as a trap may increase the likelihood of detecting presence of ransomware, since the ransomware may be more likely to attack the file(s) in the production volume.

Figure 4:
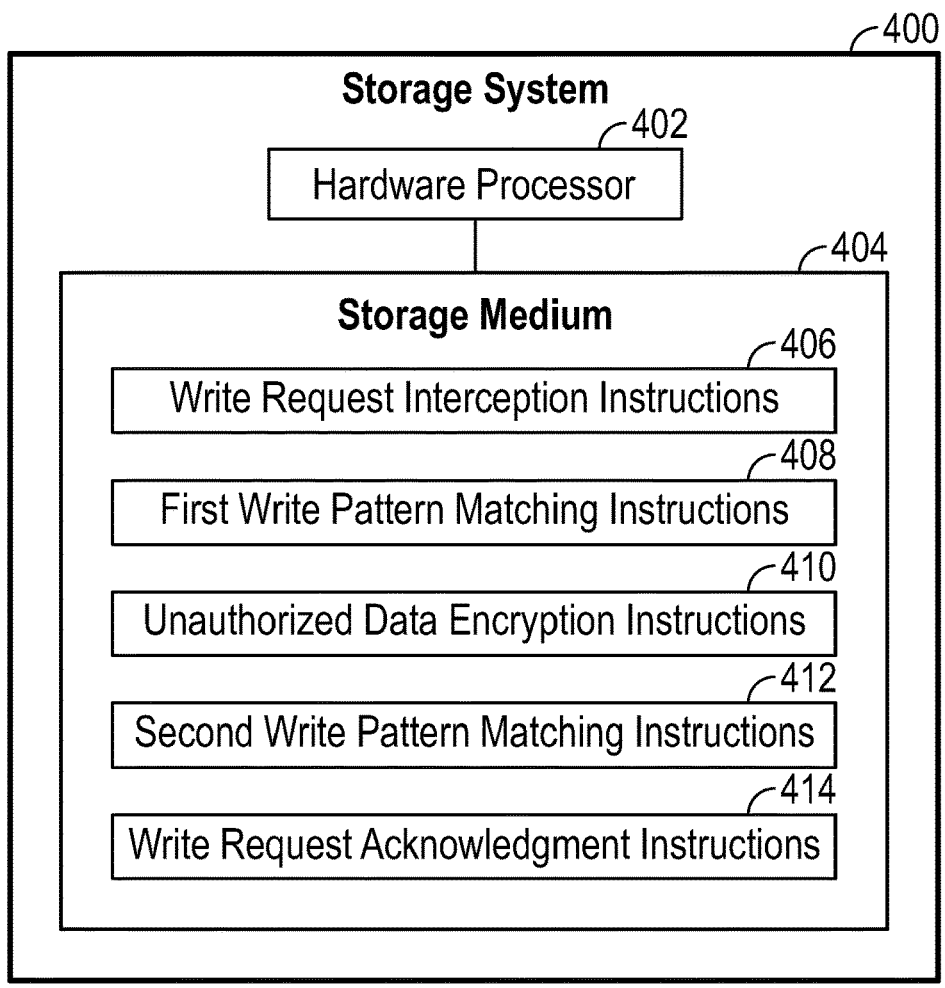
FIG. 4 is a block diagram of a storage system according to some examples.

FIG. 4 is a block diagram of a storage system 400 that includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The storage system 400 further includes a storage medium 404 that stores machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium include write request interception instructions 406 to intercept write requests communicated over a network from a designated requester in a host system. The write requests are to write respective data of a data volume. The data volume can be the trap volume 114 or a portion of the production volume 118, for example.

The machine-readable instructions in the storage medium include first write pattern matching instructions 408 to determine whether data of a first write request of the write requests matches a first specified pattern. For example, the first write request may be from the support program 112 and may have been corrupted by the ransomware 130.

The machine-readable instructions in the storage medium include unauthorized data encryption detection instructions 410 to, in response to determining that the data of the first write request does not match the first specified pattern, indicate an occurrence of an unauthorized data encryption.

The machine-readable instructions in the storage medium include second write pattern matching instructions 412 to determine whether data of a second write request of the write requests matches a second specified pattern. For example, the second write request may be from the support program 112 and has not been corrupted by the ransomware 130.

The machine-readable instructions in the storage medium include write request acknowledgement instructions 414 to, in response to determining that the data of the second write request matches the second specified pattern, acknowledge a completion of the second write request.

In some examples, the first specified pattern includes a first value derived from a function applied on first storage location information at which the data of the first write request is to be stored, the first storage location information specifying a first storage location in the data volume, and the second specified pattern includes a second value derived from the function applied on second storage location information at which the data of the second write request is to be stored, the second storage location information specifying a second storage location in the data volume.

Figure 5:
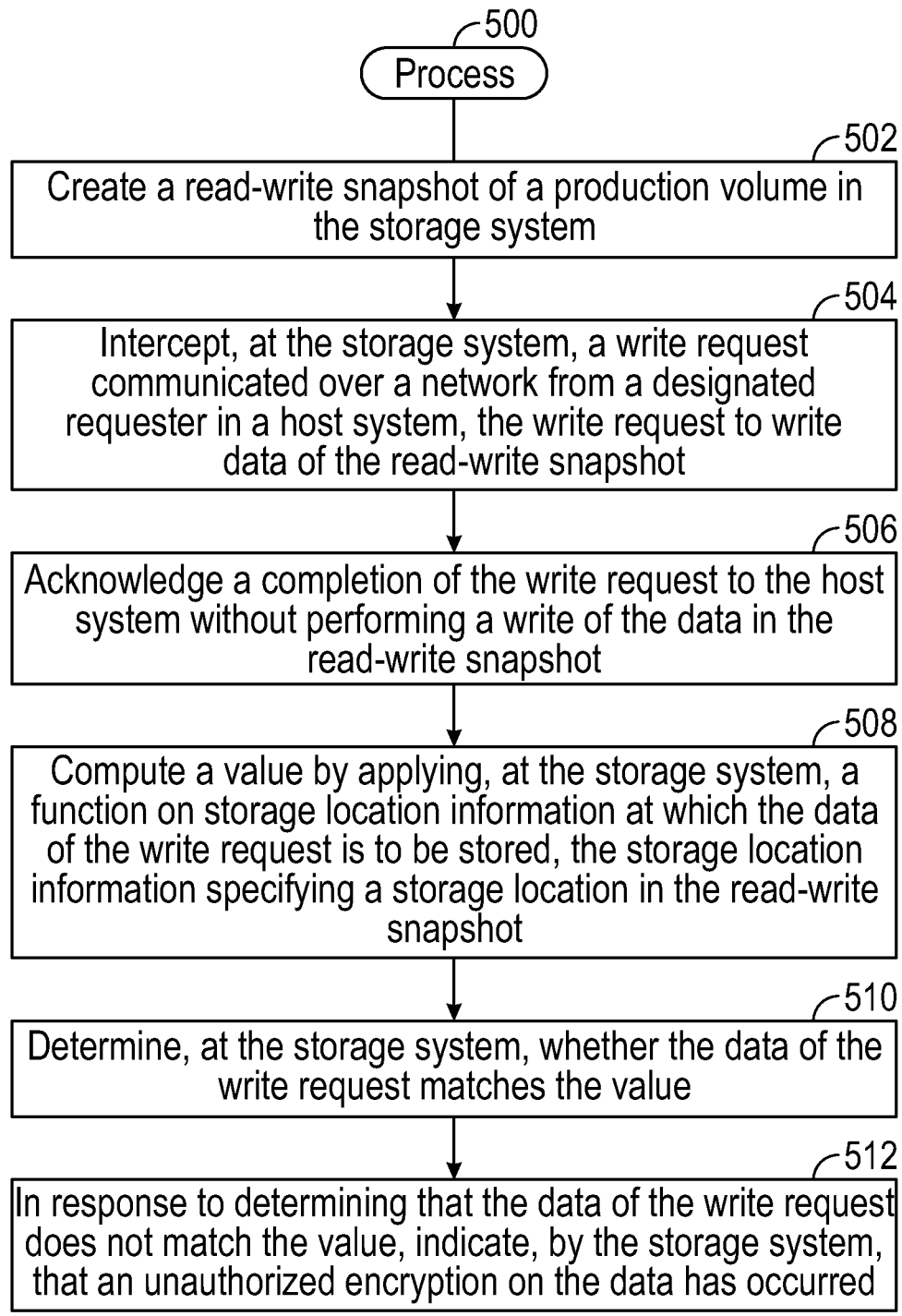
FIG. 5 is a flow diagram of a process according to some examples.

FIG. 5 is a flow diagram of a process 500 according to some examples.

The process 500 includes creating (at 502) a read-write snapshot of a production volume in the storage system. The read-write snapshot initially includes a copy of data in the production volume, but the read-write snapshot is capable of being modified by writes to the read-write snapshot.

The process 500 includes intercepting (at 504), at the storage system, a write request communicated over a network from a designated requester in a host system, the write request to write data of the read-write snapshot. The designated requester can be the support program 112 of FIG. 1, for example, and the interception of the write request can be performed by the ransomware detection engine 110, for example.

The process 500 includes acknowledging (at 506) a completion of the write request to the host system without performing a write of the data in the read-write snapshot.

The process 500 includes computing (at 508) a value by applying, at the storage system, a function on storage location information at which the data of the write request is to be stored, the storage location information specifying a storage location in the read-write snapshot. The function applied can be a hash function, for example.

The process 500 includes determining (at 510), at the storage system, whether the data of the write request matches the value. The value can be a hash value produced by the hash function, for example.

In response to determining that the data of the write request does not match the value, the process include 500 indicating (at 512), by the storage system, that an unauthorized encryption on the data has occurred.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a storage system to:
   intercept, at the storage system, a write request communicated over a network from a requester in a host system, the write request to write data of a trap volume comprising a honeypot storing dummy data;
   compute a value by applying, at the storage system, a hash function on storage location information at which the data of the write request is to be stored, the storage location information specifying a logical address or a physical address of a storage location in the trap volume;
   determine, at the storage system, whether the data of the write request targeting the trap volume matches the computed value; and
   in response to determining that the data of the write request targeting the trap volume does not match the computed value, indicate that the write request from the requester in the host system has been corrupted by malware that has performed an unauthorized encryption on the data.

2. The non-transitory machine-readable storage medium of claim 1, wherein the instructions upon execution cause the storage system to:
   acknowledge a completion of the write request without performing a write of the data in the trap volume.

3. The non-transitory machine-readable storage medium of claim 1, wherein the computed value is based on applying the hash function on the physical address, and the determining comprises determining whether the data of the write request matches the computed value produced by applying the hash function on the physical address.

4. The non-transitory machine-readable storage medium of claim 1, wherein the computed value is based on applying the hash function on the logical address, and the determining comprises determining whether the data of the write request matches the computed value produced by applying the hash function on the logical address.

5. The non-transitory machine-readable storage medium of claim 1, wherein the instructions upon execution cause the storage system to:
   create the trap volume by taking a snapshot of a production volume in the storage system.

6. The non-transitory machine-readable storage medium of claim 5, wherein the snapshot is a read-write snapshot.

7. The non-transitory machine-readable storage medium of claim 1, wherein the instructions upon execution cause the storage system to:
   intercept, by the instructions, the write request from the requester prior to the write request being processed by input/output (I/O) control logic in the storage system.

8. The non-transitory machine-readable storage medium of claim 7, wherein the instructions do not intercept write requests from entities other than the requester in the host system.

9. The non-transitory machine-readable storage medium of claim 1, wherein the instructions upon execution cause the storage system to:
   receive, at the storage system over the network, a further write request from the requester in the host system, the further write request to write further data of the trap volume; and
   in response to determining that the further data of the further write request matches the computed value, acknowledge a completion of the further write request without performing a write of the further data in the trap volume.

10. A storage system comprising:
   a processor; and
   a non-transitory storage medium storing instructions executable on the processor to:
   intercept write requests communicated over a network from a designated requester in a host system, the write requests to write respective data of a trap volume comprising a honeypot storing dummy data;
   compute a first value by applying, at the storage system, a hash function on first storage location information at which data of a first write request is to be stored, the first storage location information specifying a logical address or a physical address of a first storage location in the trap volume, and the first write request targeting the trap volume;
   determine whether the data of the first write request matches the computed first value;
   in response to determining that the data of the first write request targeting the trap volume does not match the computed first value, indicate an occurrence of an unauthorized data encryption;
   compute a second value by applying, at the storage system, the hash function on second storage location information at which data of a second write request is to be stored, the second storage location information specifying a logical address or a physical address of a second storage location in the trap volume, and the second write request targeting the trap volume;

determine whether the data of the second write request matches the computed second value; and in response to determining that the data of the second write request targeting the trap volume matches the computed second value, acknowledge a completion of the second write request.

11. The storage system of claim 10, wherein the first storage location information is different from the second storage location information.

12. The storage system of claim 10, wherein the computed first value is based on applying the hash function on the physical address of the first storage location, and wherein the computed second value is based on applying the hash function on the physical address of the second storage location.

13. The storage system of claim 10, wherein the computed first value is based on applying the hash function on the logical address of the first storage location, and wherein computed second value is based on applying the hash function on the logical address of the second storage location.

14. The storage system of claim 10, wherein the instructions are executable on the processor to:

create the trap volume by taking a snapshot of a production volume in the storage system.

15. The storage system of claim 14, wherein the snapshot is a read-write snapshot.

16. The storage system of claim 10, wherein the instructions are executable on the processor to:

intercept, by the instructions, the write requests from the designated requester prior to the write requests being processed by storage control logic in the storage system.

17. The storage system of claim 16, wherein the instructions do not intercept write requests from entities other than the designated requester in the host system.

18. A method of a storage system comprising a hardware processor, comprising:

creating a read-write snapshot of a production volume in the storage system;

intercepting, at the storage system, a write request communicated over a network from a designated requester in a host system, the write request to write data of the read-write snapshot;

acknowledging a completion of the write request to the host system without performing a write of the data in the read-write snapshot;

computing a value by applying, at the storage system, a hash function on storage location information at which the data of the write request is to be stored, the storage location information specifying a logical address or a physical address of a storage location in the read-write snapshot;

determining, at the storage system, whether the data of the write request matches the computed value; and in response to determining that the data of the write request does not match the computed value, indicating, by the storage system, that an unauthorized encryption on the data has occurred.

19. The method of claim 18, wherein the read-write snapshot is a trap volume comprising a honeypot storing dummy data, and the write request targets the trap volume.

* * * * *